United States Patent
Kim

(10) Patent No.: US 12,131,232 B2
(45) Date of Patent: Oct. 29, 2024

(54) ARTIFICIAL INTELLIGENCE TASK MATCHING METHOD, APPARATUS, AND PROGRAM

(71) Applicant: ENTERLAB INC., Seoul (KR)

(72) Inventor: Bo Eon Kim, Seoul (KR)

(73) Assignee: ENTERLAB INC., Seoul (KR)

( * ) Notice: Subject to any disclaimer, the term of this patent is extended or adjusted under 35 U.S.C. 154(b) by 1042 days.

(21) Appl. No.: 17/050,164

(22) PCT Filed: Jul. 9, 2019

(86) PCT No.: PCT/KR2019/008394
§ 371 (c)(1),
(2) Date: Oct. 23, 2020

(87) PCT Pub. No.: WO2020/022669
PCT Pub. Date: Jan. 30, 2020

(65) Prior Publication Data
US 2021/0097441 A1   Apr. 1, 2021

(30) Foreign Application Priority Data

Jul. 25, 2018   (KR) .................. 10-2018-0086736

(51) Int. Cl.
| G06N 20/00 | (2019.01) |
| G06F 18/20 | (2023.01) |
| G06F 18/214 | (2023.01) |
| G06F 18/22 | (2023.01) |
| G06F 18/2413 | (2023.01) |
| G06N 5/04 | (2023.01) |

(52) U.S. Cl.
CPC .......... *G06N 20/00* (2019.01); *G06F 18/214* (2023.01); *G06F 18/22* (2023.01); *G06F 18/24137* (2023.01); *G06F 18/295* (2023.01); *G06N 5/04* (2013.01)

(58) Field of Classification Search
None
See application file for complete search history.

(56) References Cited

PUBLICATIONS

Yang, Shuo, Kunyan Han, Zhenzhe Zheng, Shaojie Tang, and Fan Wu. "Towards personalized task matching in mobile crowdsensing via fine-grained user profiling." In IEEE INFOCOM 2018—IEEE Conference on Computer Communications, pp. 2411-2419. IEEE. Conference dates Apr. 15-19, 2018. (Year: 2018).*

Deng, Dingxiong, Cyrus Shahabi, and Linhong Zhu. "Task matching and scheduling for multiple workers in spatial crowdsourcing." In Proceedings of the 23rd SIGSPATIAL International Conference on Advances in Geographic Information Systems, pp. 1-10. 2015. (Year: 2015).*

(Continued)

*Primary Examiner* — Vincent Gonzales
(74) *Attorney, Agent, or Firm* — Goldilocks Zone IP Law

(57) ABSTRACT

Disclosed is an artificial intelligence task matching method performed by a computer, the task matching method comprising the steps of: acquiring learning data including one or more task performance records; causing learning of an artificial intelligence model by using the learning data; collecting one or more pieces of volunteer information; collecting one or more pieces of task information; and matching at least one volunteer to at least one task by using the artificial intelligence model.

7 Claims, 7 Drawing Sheets

(56) References Cited

PUBLICATIONS

X. Zhang, Y. Wu, L. Huang, H. Ji and G. Cao, "Expertise-Aware Truth Analysis and Task Allocation in Mobile Crowdsourcing," 2017 IEEE 37th International Conference on Distributed Computing Systems (ICDCS), Atlanta, GA, USA, 2017, pp. 922-932. (Year: 2017).*

Byoung Ju Moon et al., Evaluation Staff Recommendation System based on Hybrid-LDA Model, 2016 Summer Comprehensive Conference of the Korean Communication Society, pp. 1051-1052 with English translation pp. 1-5.

* cited by examiner

ARTIFICIAL INTELLIGENCE TASK MATCHING METHOD, APPARATUS, AND PROGRAM

CROSS-REFERENCE TO RELATED APPLICATIONS

This application claims the benefit under 35 U.S.C. section 371, of PCT International Application No.: PCT/KR2019/008394, filed on Jul. 9, 2019, which claims foreign priority to Korean Patent Application No.: 10-2018-0086736, filed on Jul. 25, 2018, in the Korean Intellectual Property Office, both of which are hereby incorporated by reference in their entireties.

TECHNICAL FIELD

The present invention relates to an artificial intelligence task matching method, device, and program.

BACKGROUND ART

An artificial intelligence (AI) system is a computer system that implements human-level intelligence, and unlike the existing rule-based smart system, the AI system is a system in which a machine itself learns, judges, and becomes smarter. As artificial intelligence systems are used, a recognition rate thereof is improved and users' tastes may be more accurately understood and thus existing rule-based smart systems are gradually being replaced with deep learning-based artificial intelligence systems.

Artificial intelligence technology is configured with machine learning (deep learning) and element technologies using machine learning.

Machine learning is algorithm technology that classifies/learns characteristics of input data by itself, and element technology is technology that simulates functions such as cognition and judgment of a human brain using machine learning algorithms such as deep learning and is configured with technical fields such as linguistic understanding, visual understanding, interference/prediction, knowledge expression, and motion control.

Various fields where artificial intelligence technology is applied are as follows. Linguistic understanding is technology that recognizes and applies/processes human language/text and includes natural language processing, machine translation, dialogue systems, question and answer, and speech recognition/synthesis. Visual understanding is technology that recognizes and processes objects like human vision and includes object recognition, object tracking, image search, human recognition, scene understanding, spatial understanding, and image improvement. Inference prediction is technology that logically infers and predicts information by judging information and includes knowledge/probability-based interference, optimization prediction, preference-based planning, and recommendation. Knowledge expression is technology that automatically processes human experience information into knowledge data and includes knowledge construction (data creation/classification), knowledge management (data utilization), and the like. Motion control is technology that controls autonomous driving of a vehicle and movement of a robot and includes movement control (navigation, collision, driving), operation control (behavior control), and the like.

MICE is an acronym of English such as meeting, incentive trip, convention, exhibition & event, and in a narrow sense, the MICE means a promising industry centered on international conferences and exhibitions, and in a broader concept, the MICE means a convergence industry including mega events and reward tourism centered on participants.

DISCLOSURE

Technical Problem

The problem to be solved by the present invention is to provide an artificial intelligence task matching method, device, and program.

The problems to be solved by the present invention are not limited to the problems described above, and other problems that are not described will be clearly understood by those skilled in the art from the following description.

Technical Solution

A method of matching an artificial intelligence task according to an aspect of the present invention for solving the above-described problems includes obtaining learning data including one or more task execution records (S101), training an artificial intelligence model using the learning data (S102); collecting one or more applicant information (S103); collecting one or more task information (S104); and matching at least one applicant and at least one task using the artificial intelligence model (S105).

Advantageous Effects

According to the disclosed embodiment, there is an effect of simplifying unnecessary procedures occurring in a bidding process by matching a task and an applicant using an artificial intelligence model, and enabling an applicant appropriate for task contents to perform the task.

The effects of the present invention are not limited to the effects described above, and other effects that are not described will be clearly understood by those skilled in the art from the following description.

BEST MODE

Figure 1:
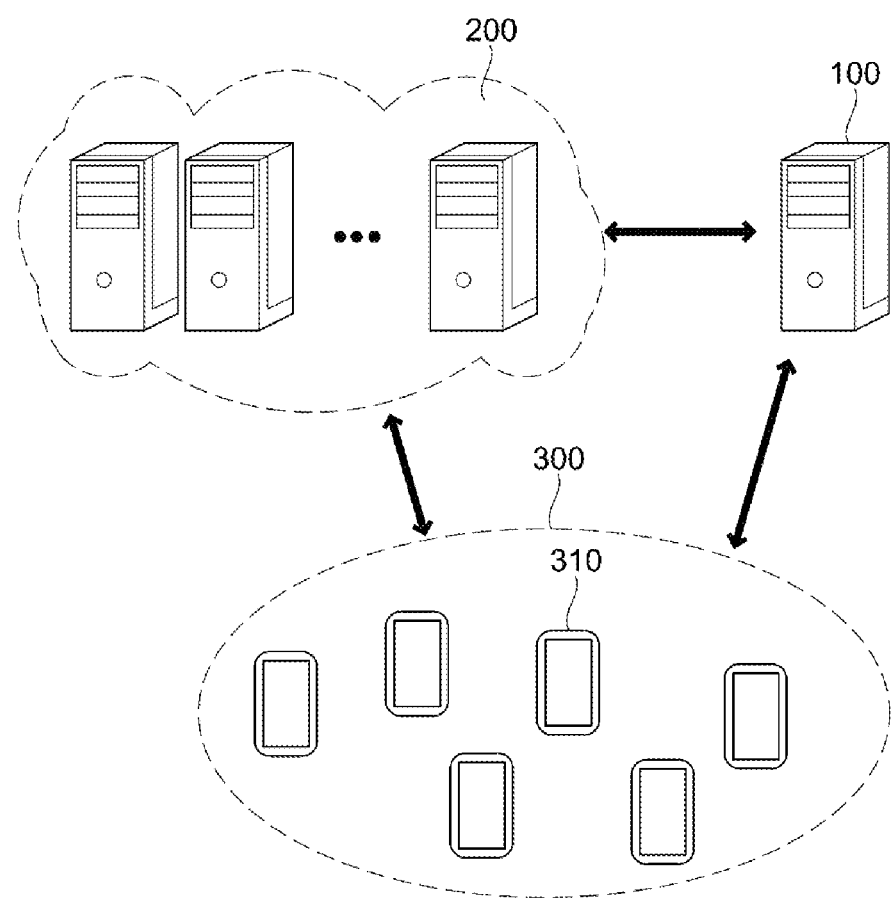
FIG. 1 is a diagram illustrating a system according to an embodiment.

A method of matching an artificial intelligence task according to an aspect of the present invention for solving the above-described problems includes obtaining learning data including one or more task execution records (S101), training an artificial intelligence model using the learning data (S102); collecting one or more applicant information (S103); collecting one or more task information (S104); and matching at least one applicant and at least one task using the artificial intelligence model (S105).

Further, the obtaining of learning data (S101) may include collecting data including at least one of contents of the task, information on a task registration subject, information on a task execution subject, and a task execution result (S106); extracting one or more parameters from the collected data (S107); and generating learning data including the extracted one or more parameters (S108).

Further, the matching of at least one applicant (S105) may include extracting one or more parameters from applicant information of a first applicant (S109); extracting one or more parameters from task information of a first task (S110), inputting parameters extracted in the extracting of one or more parameters from applicant information (S109) and the extracting of one or more parameters from task information (S110) to the artificial intelligence model (S111), and obtaining a suitability degree of the first applicant for the first task from an output of the artificial intelligence model (S112).

Further, the obtaining of a suitability degree (S112) may include obtaining a selection probability of the first applicant for the first task (S113), and obtaining a possibility of executing the first task by the first applicant (S114).

Further, the matching of at least one applicant (S105) may include clustering the one or more applicant information (S115), clustering the one or more task information (S116), calculating (S117) a distance between clusters generated as a result of clustering in the clustering of the one or more applicant information (S115) and the clustering of the one or more task information (S116), determining a degree of association between the clusters based on the calculated distance (S118), determining a first applicant cluster and a first task cluster in which the determined association degree exceeds a preset reference value (S119), and matching at least one applicant included in the determined first applicant cluster and at least one task included in the determined first task cluster (S120).

Further, the collecting of one or more task information (S104) may include obtaining MICE task information including a plurality of tasks (S121), wherein the clustering of the one or more task information (S116) may include determining a plurality of second task clusters including each of the plurality of tasks included in the MICE task information (S122); and determining a middle point of the plurality of second task clusters (S123), wherein the determining of a first applicant cluster (S119) may include determining a plurality of second applicant clusters in which a degree of association with each of the plurality of second task clusters exceeds the reference value (S124); and determining a third applicant cluster in which a degree of association from the middle point exceeds the reference value (S125), and wherein the matching of at least one applicant (S120) may include matching a plurality of applicants included in the plurality of second applicant clusters and the third applicant cluster, and the plurality of tasks, respectively (S126).

Further, the matching of a plurality of applicants (S126) may include requesting a registration subject of the MICE task information to select a task matching criterion, wherein the task matching criterion may include a best type and a harmony type (S127); receiving a selection input from the registration subject of the MICE task information (S128); matching, when the registration subject of the MICE task information selects a best type, a plurality of applicants included in the plurality of second applicant clusters and the plurality of tasks with each other (S129); and matching, when the registration subject of the MICE task information selects a harmony type, a plurality of applicants included in the third applicant cluster and the plurality of tasks with each other (S130).

Further, the matching of at least one applicant (S105) may include obtaining information on the matched task (S131); obtaining an execution result of the matched task (S132); and training the artificial intelligence model based on the obtained execution result (S133).

A device according to an aspect of the present invention for solving the above-described problems includes a memory for storing one or more instructions; and a processor for executing the one or more instructions stored in the memory, wherein the processor, by executing the one or more instructions, is configured to obtain learning data including one or more task execution records; to train an artificial intelligence model using the learning data; to collect one or more applicant information; to collect one or more task information; and to match at least one applicant and at least one task using the artificial intelligence model.

In accordance with an aspect of the present invention for solving the above-described problems, there is provided a computer program stored in a recording medium combined with a computer as hardware and readable by a computer so as to perform a method of matching an artificial intelligence task according to the disclosed embodiment.

Other specific details of the present invention are included in the detailed description and drawings.

MODE FOR INVENTION

The advantages and features of the present invention and a method of achieving them will become apparent with reference to the embodiments described in detail below together with the accompanying drawings. However, the present invention is not limited to the embodiments disclosed below, but may be implemented in various different forms, and the present embodiments are provided only to make the disclosure of the present invention complete, and to fully inform the scope of the present invention to those skilled in the art to which the present invention belongs, and the present invention is only defined by the scope of the claims.

Terms used in the present specification are not to limit the present invention but to illustrate embodiments. In the present specification, the singular form also includes the plural form unless specifically stated in the phrase. As used in the specification, "comprises" and/or "comprising" do not exclude the presence or addition of one or more other elements other than the described elements. Throughout the specification, the same reference numerals refer to the same elements, and "and/or" includes each and all combinations of one or more of the described elements. Although "first", "second", and the like are used for describing various elements, but these elements are not limited by these terms. These terms are used for only distinguishing one element from another element. Therefore, a first element described below may be a second element within the scope of the present invention.

Unless otherwise defined, all terms (including technical and scientific terms) used in the present specification may be used as meanings that can be commonly understood by those of ordinary skill in the art to which the present invention belongs. Further, terms defined in a commonly used dictionary are not interpreted ideally or excessively unless explicitly defined specifically.

The term "unit" or "module" used in the specification means a hardware element such as software, FPGA or ASIC, and the "unit" or "module" performs certain roles. However, "unit" or "module" is not meant to be limited to software or hardware. The "unit" or "module" may be configured to be in an addressable storage medium or may be configured to reproduce one or more processors. Therefore, "unit" or "module" includes, for example, components such as software components, object-oriented software components, class components, and task components, processes, functions, attributes, procedures, subroutines, segments of a program code, drivers, firmware, microcode, circuit, data, database, data structures, tables, arrays, and variables. A function provided within components and "unit" or "module" may be performed by coupling the smaller number of components and "unit" or "module" or by subdividing the components and "unit" or "module" into additional components and "unit" or "module".

In the present specification, a computer means all kinds of hardware devices including at least one processor, and may be understood as encompassing a software configuration operating in the corresponding hardware device according to embodiments. For example, the computer may be understood as including all of a smartphone, a tablet PC, a desktop PC, a laptop PC, and a user client and an application running in each device, but it is not limited thereto.

Hereinafter, embodiments of the present invention will be described in detail with reference to the accompanying drawings.

Each of steps described in the present specification is described as being performed by a computer, but the subject of each step is not limited thereto, and at least some of each step may be performed by different devices according to embodiments.

In the present specification, the task may be understood as a meaning including procurement performed by the government and a bid announcement for the same, but it is not limited thereto. For example, a registration subject of the task may include public enterprises, private enterprises, and individuals other than the government, and is not limited thereto.

The type of the task may also include various types such as in-kind and services, and is not limited to a specific type. For example, the task may be for delivering a specific product or may be for a research service or a professional service business.

FIG. 1 is a diagram illustrating a system according to an embodiment.

Referring to FIG. 1, a management server 100, a cloud server 200, and user terminals 300 are illustrated.

In an embodiment, the management server 100 or the cloud server 200 may train an artificial intelligence model used for task matching according to the disclosed embodiment. The management server 100 and the cloud server 200 may share learning data required for training an artificial intelligence model, and share parameters constituting a model generated as a learning result.

In an embodiment, the management server 100 or the cloud server 200 may obtain learning data using information collected from the user terminals 300 and train an artificial intelligence model based on the obtained learning data.

In an embodiment, training of the artificial intelligence model may be performed in the cloud server 200, and the management server 100 may obtain the learned artificial intelligence model from the cloud server 200 to perform task matching according to the disclosed embodiment.

In an embodiment, the management server 100 may obtain various applicant information such as each applicant's career, business history, sales, performance, business field, and past procurement history, analyzes the various applicant information, and extract and provide task information in which each applicant can easily perform.

According to the embodiment, an artificial intelligence model that compares applicant information and task information to extract a degree of suitability may be used. In the present specification, the artificial intelligence model is understood as a meaning including a model learned through machine learning.

For example, the artificial intelligence model may mean a model that has been learned using big data including existing task information and information on a company selected to correspond to each task information as learning data. Further, information on a procurement performance of the selected company may be included in the learning data, and information on whether each company has actually performed well procurement is also collected as big data, which may be used for training an artificial intelligence model.

For example, the computer may obtain a form of a proposal based on the task information and write a proposal using applicant information. According to the embodiment, the computer may extract applicant information appropriate for the task information (i.e., the advantage of the applicant corresponding to the task information) using an artificial intelligence model, and automatically write a proposal based on the extracted applicant information.

As another example, by extracting applicant information appropriate for the task information using an artificial intelligence model and providing the extracted applicant information to the applicant, the computer may assist the applicant in preparing a proposal.

For example, even if qualification conditions included in each task information are satisfied, it may not be possible to successfully bid for the task information (i.e., to be selected). Accordingly, by analyzing and comparing the applicant information and contents included in each task information, the computer may calculate the probability that the applicant can be selected for each task information.

Various artificial intelligence models may be used for calculating the probability. For example, as a model learned based on machine learning, an artificial intelligence model capable of inputting applicant information and task information and outputting a selection probability based on the applicant information and the task information may be used.

In an embodiment, the artificial intelligence model may extract a parameter for calculating a selection probability from each applicant information and task information through natural language processing. The computer may input the extracted parameters to the artificial intelligence model, and obtain a selection probability by an output thereof. The artificial intelligence model may be learned using, as learning data, big data including information on previously ended tasks and information on applicants selected to correspond to each task information. According to an embodiment, the learned model may include parameters obtained by preprocessing big data.

In another embodiment, a model capable of extracting a parameter may be separately learned and used, or a computer may guess a parameter, provide a guess result to an applicant, and then input the parameter selected by the applicant to an artificial intelligence model, thereby calculating the selection probability.

Hereinafter, a method of matching an artificial intelligence task according to the disclosed embodiment will be described in detail with reference to the drawings.

Figure 2:
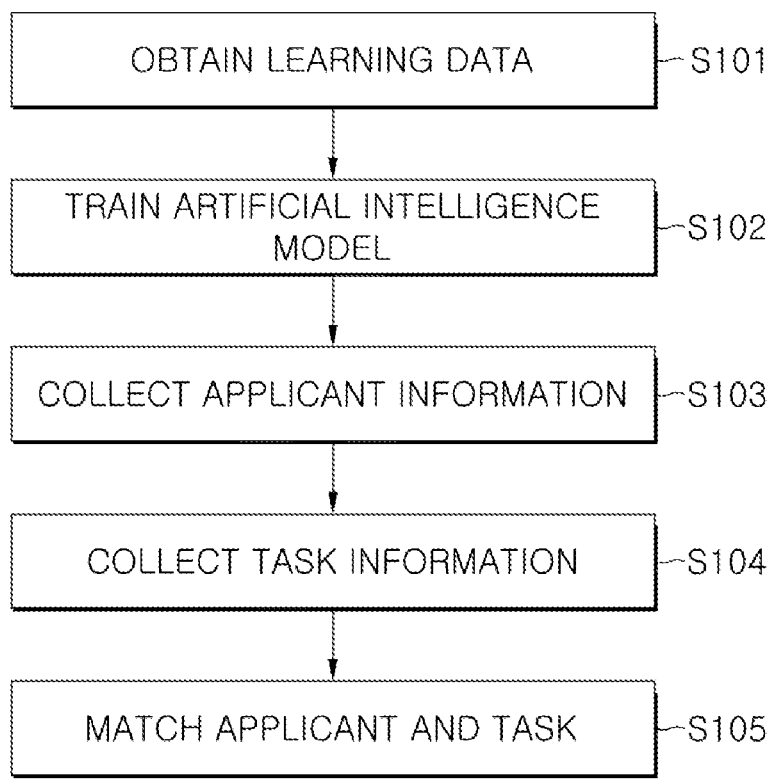
FIG. 2 is a flowchart illustrating a method of matching an artificial intelligence task according to an embodiment.

FIG. 2 is a flowchart illustrating a method of matching an artificial intelligence task according to an embodiment.

In step S101, the computer obtains learning data including one or more task execution records.

In an embodiment, the task execution record may include information on a type of task, a task execution subject, a task registration subject and each subject and information on task execution result and a history, but it is not limited thereto.

In step S102, the computer trains an artificial intelligence model using the learning data.

In the present specification, the artificial intelligence model may mean a model learned using machine learning, and in particular, the artificial intelligence model may mean a model learned using deep learning, but it is not limited thereto.

In step S103, the computer collects one or more applicant information.

In the present specification, the applicant information may include information on a company (applicant) that performs task bidding, but it is not limited thereto. In the present specification, a 'company' may be understood as a meaning including not only a business entity such as an individual business entity or a corporation, but also a general individual, and does not limit a specific target.

In step S104, the computer collects one or more task information.

In the present specification, the task may be understood as a meaning including procurement performed by the government and a bid announcement for the same, but it is not limited thereto. For example, the registration subject of the task may include public enterprises, private enterprises, and individuals other than the government, and is not limited thereto.

In step S105, the computer matches at least one applicant and at least one task using the artificial intelligence model.

In an embodiment, the artificial intelligence model may be a model of a form that calculates probability based on an input parameter, or may be a model that performs classification through clustering, but it is not limited thereto.

A detailed method of matching the task and the applicant using the artificial intelligence model will be described later.

Figure 3:
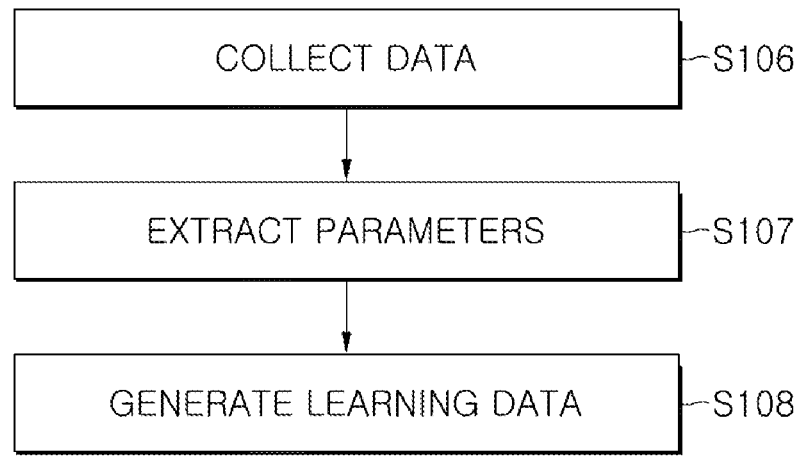
FIG. 3 is a flowchart illustrating a method of generating learning data according to an embodiment.

FIG. 3 is a flowchart illustrating a method of generating learning data according to an embodiment.

In the above-described step (S101), the computer may perform step (S106) of collecting data including at least one of contents of the task, information on a task registration subject, information on a task execution subject, and a task execution result.

In an embodiment, the computer may collect data from the user terminals 300 and collect data from an external server or a database.

Further, the computer may perform step (S107) of extracting one or more parameters from the collected data.

For example, the parameter may be configured with quantified numbers or keywords, but it is not limited thereto, and the parameter may mean data in a form that may be used as an input or output of an artificial intelligence model.

Further, the computer may perform step (S108) of generating learning data including the extracted one or more parameters.

For example, the computer may generate learning data including parameters corresponding to each of an input data format and an output data format of the artificial intelligence model. For example, the learning data may further include information on the relationship between parameters extracted from each task and the applicant, and parameters of the matched tasks and applicant based on information on the previously matched task and applicant, and evaluation items according to the task execution result may be reflected in the relationship between each parameter.

Figure 4:
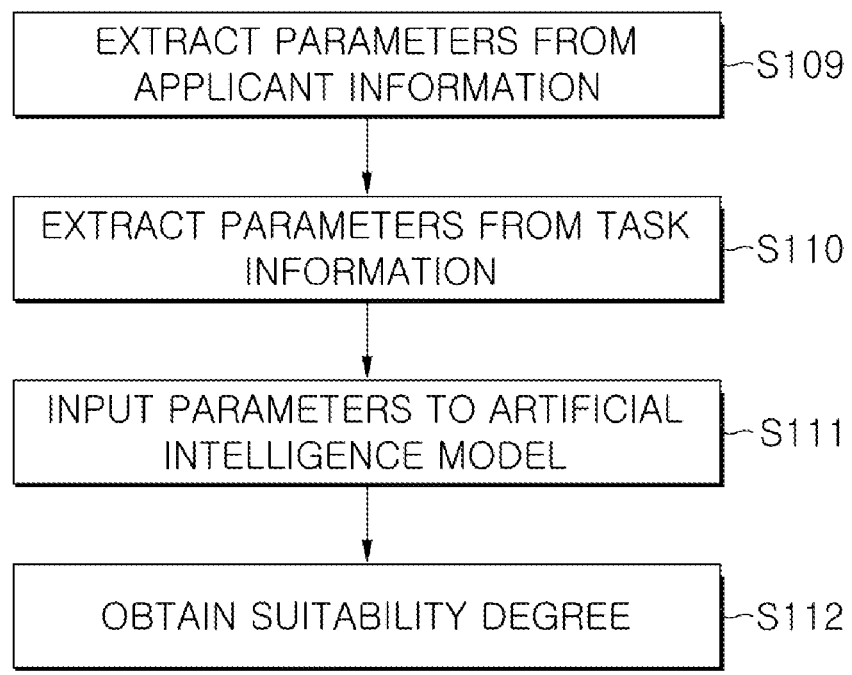
FIG. 4 is a flowchart illustrating a matching method according to an embodiment.

FIG. 4 is a flowchart illustrating a matching method according to an embodiment.

In the above-described step (S105), the computer may perform step (S109) of extracting one or more parameters from applicant information of a first applicant.

Further, the computer may perform step (S110) of extracting one or more parameters from task information of the first task.

Further, the computer may perform step (S111) of inputting the parameters extracted in the steps S109 and S110 to the artificial intelligence model.

Further, the computer may perform step (S112) of obtaining a suitability degree of the first applicant for the first task from the output of the artificial intelligence model.

That is, the computer may extract parameters from different applicants and tasks, input the extracted parameters to the learned artificial intelligence model, and determine a degree of suitability between the task and the applicant as an output thereof. The degree of suitability may be obtained in the form of positive/negative binary data or may be obtained in the form of probability, but it is not limited thereto.

Figure 5:
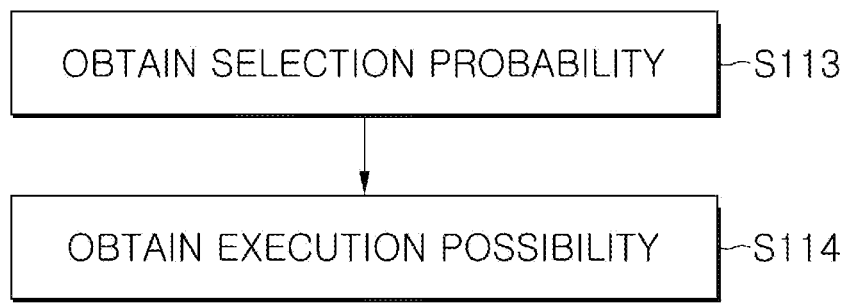
FIG. 5 is a flowchart illustrating a method of determining a suitability degree according to an embodiment.

FIG. 5 is a flowchart illustrating a method of determining a suitability degree according to an embodiment.

In the above-described step (S112), the computer may perform step (S113) of obtaining a selection probability of the first applicant for the first task.

For example, as described above, even if qualification conditions included in each task information are satisfied, it may not be possible to successfully bid for the task information (i.e., to be selected). Accordingly, by analyzing and comparing the applicant information and contents included in each task information, the computer may calculate a probability that the applicant may be selected for each task information.

Various artificial intelligence models may be used for calculating the probability. For example, as a model learned based on machine learning, an artificial intelligence model capable of inputting applicant information and task information and outputting a selection probability based on the applicant information and the task information may be used.

In an embodiment, the artificial intelligence model may extract parameters for calculating a selection probability from each applicant information and task information through natural language processing. The computer inputs the extracted parameters to the artificial intelligence model, thereby obtaining a selection probability as an output thereof. The artificial intelligence model may be learned using, as learning data, big data including information on previously ended tasks and information on applicants selected to correspond to each task information. According to an embodiment, the learned model may include parameters obtained by preprocessing big data.

In another embodiment, a model capable of extracting a parameter may be separately learned and used, or the computer guesses a parameter, provides a guess result to an applicant, and then inputs a parameter selected by the applicant to an artificial intelligence model, thereby calculating a selection probability.

Further, the computer may perform step (S114) of obtaining a possibility of executing the first task by the first applicant.

For example, when bidding for each task information is successful based on the applicant's resource information, the computer may determine whether the applicant has a resource to perform the task to evaluate an execution possibility of the applicant.

In an embodiment, the computer may determine whether the applicant's double bidding and the multiple of the double bidding. For example, the computer may determine how many times more task information than the applicant's resources will be provided to the applicant.

Further, the computer may calculate an expanded resource of the applicant based on resource information of the applicant and the multiple of double bidding. For example, the computer may calculate the applicant's expanded resource by multiplying the applicant's resource information by the multiple of double bidding.

In an embodiment, the computer may provide the applicant with task information of the number in which the applicant can apply based on the expanded resource. For example, when the multiple of double bidding is three times, the computer may provide the applicant with task information of an amount equivalent to three times than the applicant's resource.

In an embodiment, the computer provides task information based on the expanded resource, but when a required resource of single task information exceeds the applicant's resource, the task information may not be provided to the applicant. That is, the computer may provide task information requiring resources equal to or less than the applicant's resource, but may provide task information of the number that enables a required resource of the entire task information to be equal to or less than the extension resource of the applicant.

Figure 6:
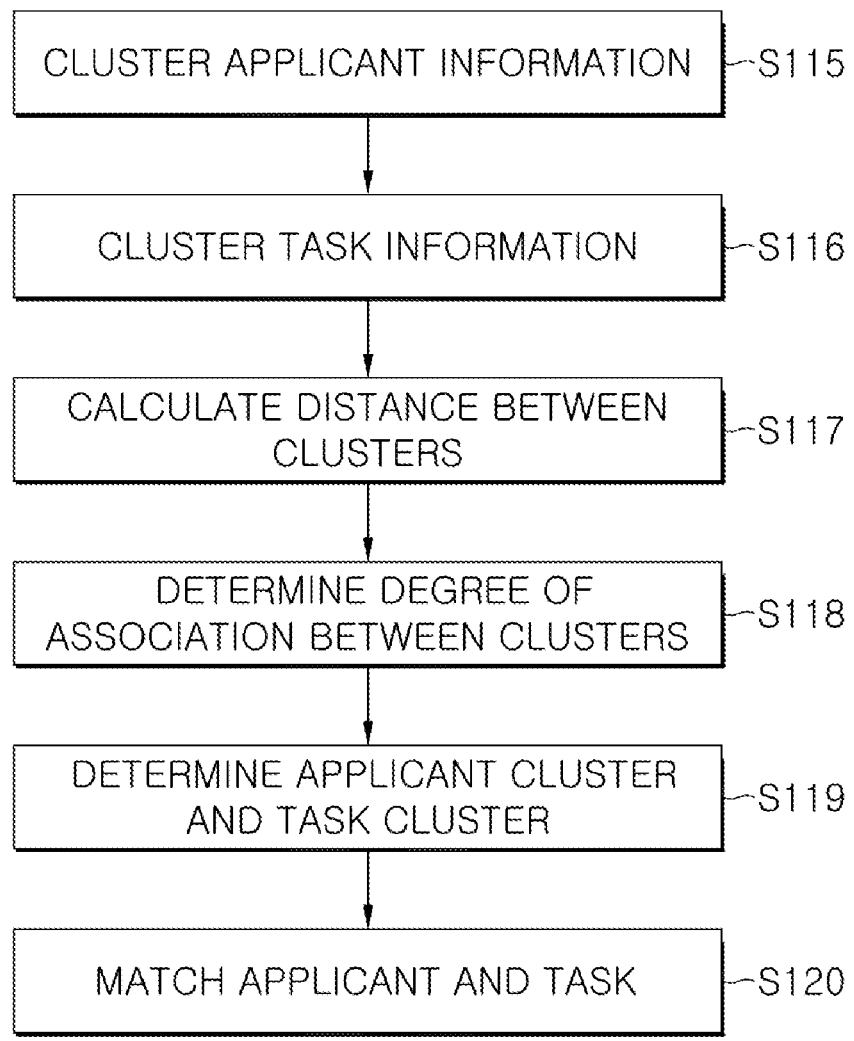
FIG. 6 is a flowchart illustrating a clustering method according to an embodiment.

FIG. 6 is a flowchart illustrating a clustering method according to an embodiment.

In the above-described step (S105), the computer may perform step (S115) of clustering the one or more applicant information.

In an embodiment, the computer may obtain characteristics representing each applicant cluster as a keyword.

Further, the computer may perform step (S116) of clustering the one or more task information.

In an embodiment, the computer may obtain characteristics representing each task cluster as a keyword.

Further, the computer may perform step (S117) of calculating a distance between clusters generated as a result of clustering of the steps (S115) and (S116).

Further, the computer may perform step (S118) of determining a degree of association between the clusters based on the calculated distance.

In an embodiment, clusters having similar characteristics may be located closer to each other. Therefore, the computer may determine a degree of association between each cluster based on the distance.

Further, the computer may perform step (S119) of determining a first applicant cluster and a first task cluster in which the determined association degree exceeds a preset reference value.

For example, the computer may select an applicant cluster located within a predetermined distance for each task cluster, and associate the selected task with the applicant cluster.

Further, the computer may perform step (S120) of matching at least one applicant included in the determined first applicant cluster with at least one task included in the determined first task cluster.

In an embodiment, the computer may determine a suitability degree between each task and applicant included in the first applicant cluster and the first task cluster using the artificial intelligence model described in relation to FIGS. 2 to 5, and match the applicant and the task with each other based on the determined suitability degree.

Figure 7:
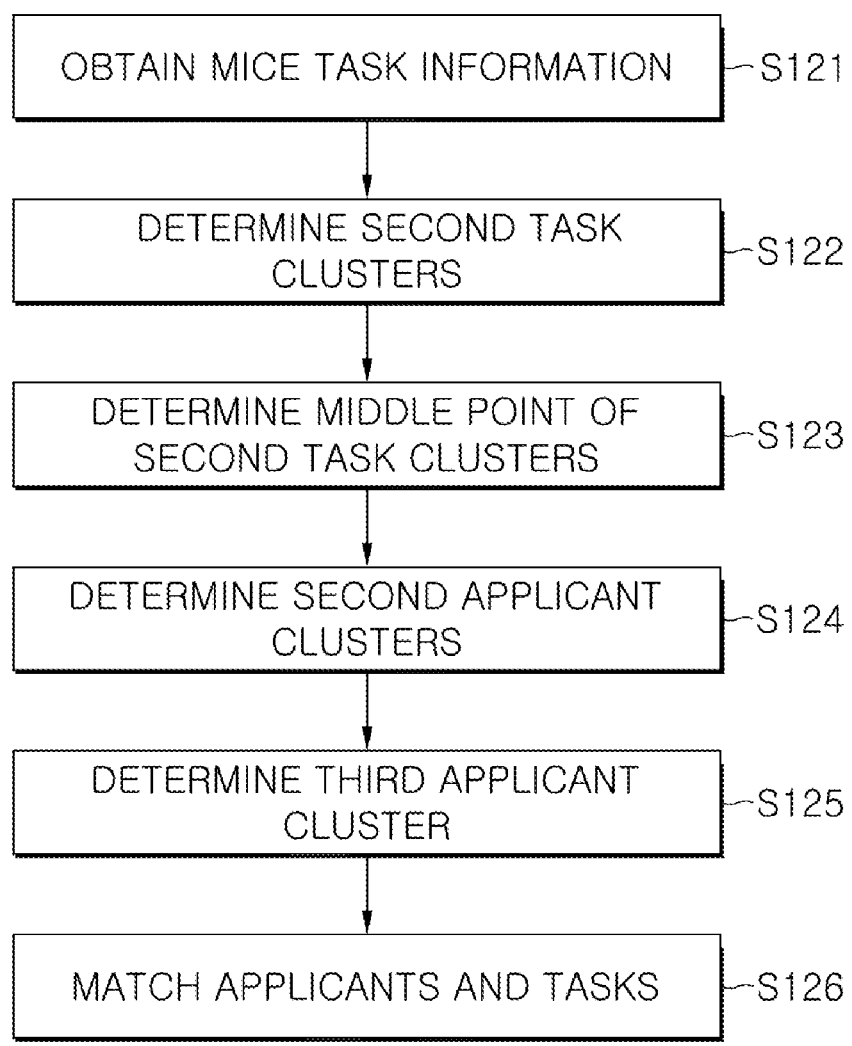
FIG. 7 is a flowchart illustrating a MICE task matching method according to an embodiment.

FIG. 7 is a flowchart illustrating a MICE task matching method according to an embodiment.

In the above-described step (S104), the computer may perform step (S121) of obtaining MICE task information including a plurality of tasks.

In the above-described step (S116), the computer may perform step (S122) of determining a plurality of second task clusters including each of the plurality of tasks included in the MICE task information.

In the present specification, MICE is an acronym of English such as meeting, incentive trip, convention, and exhibition & event and in a narrow sense, the MICE means a promising industry centered on international conferences and exhibitions, and in a broader concept, the MICE means a convergence industry that includes mega events and reward tourism centered on participants. However, the meaning of MICE in the present specification is not limited to the term itself, and may be used in various terms according to time and region.

For example, in Canada, Meeting, Convention and Incentive Travel is used as MC&IT, in the United States, ME&I or MEEC (Meetings, Expositions, Events and Conventions) is used, and in Singapore, Business Travel & MICE is used as BT MICE, i.e., various terms are used according to an industrial structure and policy of each country. In the present specification, the MICE task information may include each task information for meetings, tourism, shopping, transportation (air, bus, etc.), accommodation, and exhibition.

Further, the computer may perform step (S123) of determining a middle point of the plurality of second task clusters.

In an embodiment, the middle point of the plurality of second task clusters may represent a median value of each characteristic.

In the above-described step (S119), the computer may perform step (S124) of determining a plurality of second applicant clusters in which a degree of association with each of the plurality of second task clusters exceeds the reference value.

That is, the second applicant cluster may mean an applicant cluster corresponding to each task characteristic.

Further, the computer may perform step (S125) of determining a third applicant cluster in which a degree of association from the middle point exceeds the reference value.

That is, the third applicant cluster may mean a cluster corresponding to a median value of the overall task characteristics.

In the above-described step (S120), the computer may perform step (S126) of matching a plurality of applicants included in the plurality of second applicant clusters and the third applicant cluster, and the plurality of tasks, respectively.

In an embodiment, the computer may select each applicant corresponding to each task characteristic, or may select an applicant having a characteristic corresponding to the middle of the overall task characteristic and match the applicant with the task.

Figure 8:
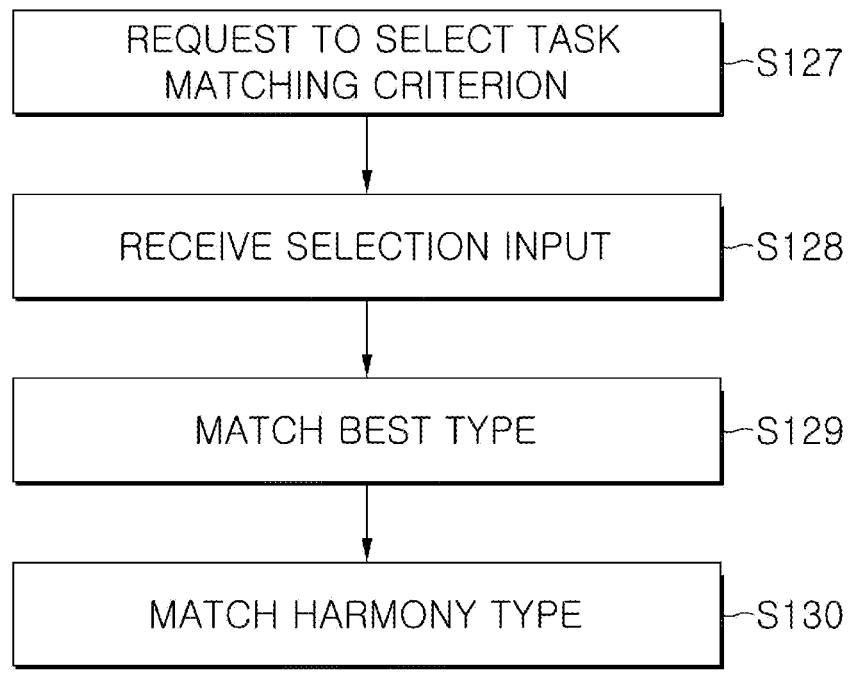
FIG. 8 is a flowchart illustrating a matching method according to task matching criteria according to an embodiment.

FIG. 8 is a flowchart illustrating a matching method according to task matching criteria according to an embodiment.

In the above-described step (S126), the computer may request a registration subject of the MICE task information to select a task matching criterion, and the task matching criterion may perform step (S127) of including a best type and a harmony type.

Further, the computer may perform step (S128) of receiving a selection input from the registration subject of the MICE task information.

Further, when the registration subject of the MICE task information selects the best type, the computer may perform step (S129) of matching a plurality of applicants included in the plurality of second applicant clusters and the plurality of tasks with each other.

That is, the best type is to match an applicant with the best characteristics to each task.

Further, when the registration subject of the MICE task information selects the harmony type, the computer may perform step (S130) of matching a plurality of applicants included in the third applicant cluster and the plurality of tasks with each other.

That is, the harmony type is to match an applicant who has intermediate characteristics to each task. In the case of MICE tasks, the unity between different tasks may be important. Accordingly, the computer may select and match an applicant having intermediate characteristics of each task cluster according to the user's selection.

In an embodiment, the computer may generate joint bidding information by integrating applicants to be matched to each task included in the MICE task information, and provide the generated joint bidding information to each applicant.

For example, in the case of MICE tasks, various items are included together, and it may be difficult for one company to perform all of the various items. Therefore, the computer may collect information on other companies that can perform task items in which the applicant cannot perform, provide the collected information to each applicant, and enable at least some of the companies and applicants to jointly apply for MICE tasks.

Figure 9:
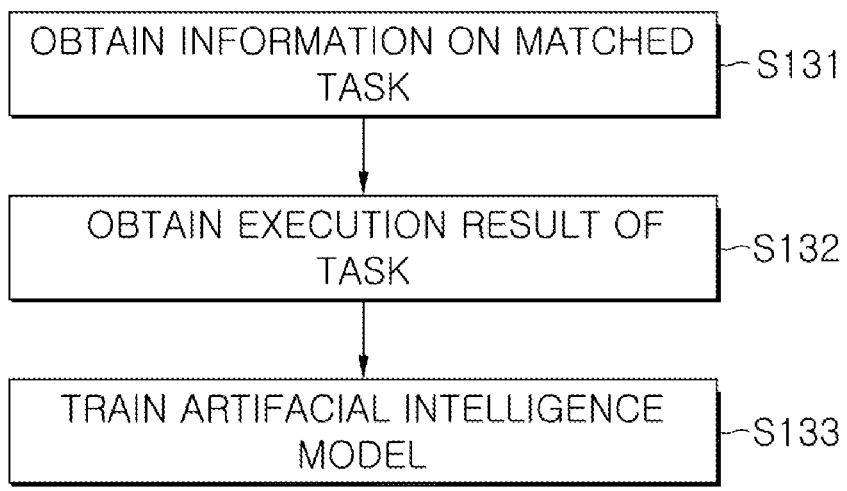
FIG. 9 is a flowchart illustrating a method of training an artificial intelligence model according to an embodiment.

FIG. 9 is a flowchart illustrating a method of learning an artificial intelligence model according to an embodiment.

In the above-described step (S105), the computer may perform step (S131) of obtaining information on the matched task.

Further, the computer may perform step (S132) of obtaining an execution result of the matched task.

Further, the computer may perform step (S133) of training the artificial intelligence model based on the obtained execution result.

That is, when a contract is executed and a task is executed according to the matching result, by obtaining the result and using again the result as learning data, the computer may train the artificial intelligence model. According to an embodiment, the computer may evaluate a task execution result according to the matching result, and accordingly perform reinforcement learning on an artificial intelligence model.

In an embodiment, the task information provided to the applicant may include information for bidding on the task. According to the embodiment, the computer automatically applies to the extracted task information according to an selection input or preset contents from the applicant, or automatically writes at least part or all of a proposal for applying to the extracted task information to provide the written at least part or all of the proposal to the applicant.

For example, the computer may obtain a form of a proposal based on the task information and write a proposal using the applicant information. According to the embodiment, the computer may extract applicant information appropriate for the task information (i.e., the advantage of the applicant corresponding to the task information) using an artificial intelligence model and automatically write a proposal based on the extracted applicant information.

In an embodiment, the artificial intelligence model according to the disclosed embodiment may classify proposals from different applicants, and proposals adopted and proposals not adopted in each task. Further, each proposal may be classified by field.

The artificial intelligence model may extract keywords or characteristics included in the adopted proposal using each proposal as learning data, and automatically generate a proposal based on the extracted keywords or characteristics.

As another example, by extracting the applicant information appropriate for the task information using an artificial intelligence model and providing the extracted applicant information to the applicant, the computer may assist the applicant in preparing a proposal.

Figure 10:
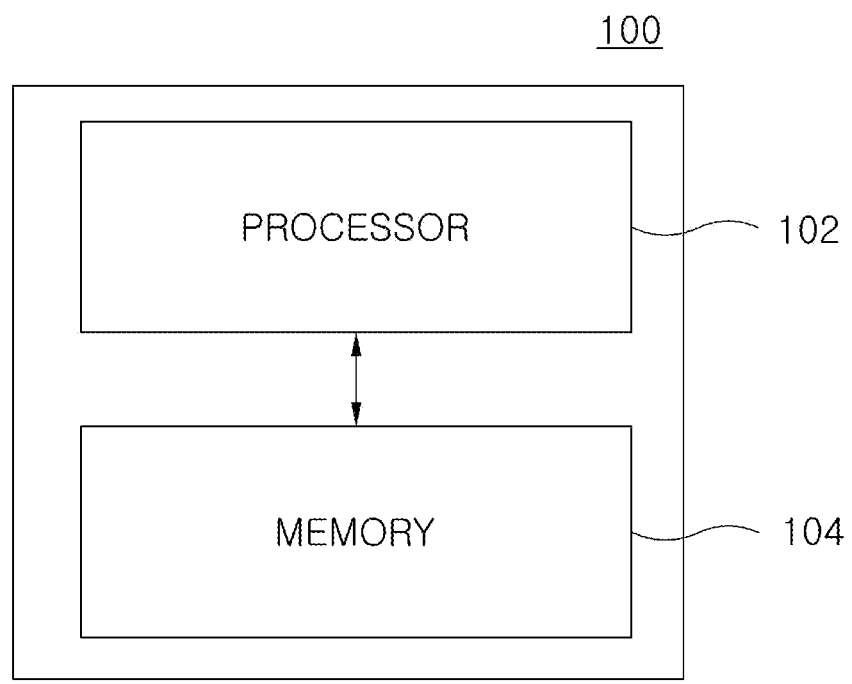
FIG. 10 is a block diagram of a device according to an embodiment.

FIG. 10 is a block diagram of a device according to an embodiment.

A processor 102 may include one or more cores (not illustrated) and a graphic processing unit (not illustrated) and/or a connection path (e.g., bus) for transmitting and receiving signals to and from other components.

The processor 102 according to an embodiment performs the method described with reference to FIGS. 1 to 9 by executing one or more instructions stored in a memory 104.

For example, the processor 102 obtains learning data including one or more task execution records by executing one or more instructions stored in the memory, trains an artificial intelligence model using the learning data, collects one or more applicant information, collects one or more task information, and matches at least one applicant with at least one task using the artificial intelligence model.

The processor 102 may further include a Random Access Memory (RAM, not illustrated) and a Read-Only Memory (ROM, not illustrated) for temporarily and/or permanently storing signals (or data) processed therein. Further, the processor 102 may be implemented in the form of a system on chip (SoC) including at least one of the graphic processing unit, RAM, and ROM.

The memory 104 may store programs (one or more instructions) for processing and controlling the processor 102. Programs stored in the memory 104 may be divided into a plurality of modules according to functions.

Steps of a method or algorithm described in relation to an embodiment of the present invention may be implemented directly in hardware, implemented in a software module executed by hardware, or a combination thereof. The software module may reside in a Random Access Memory (RAM), Read Only Memory (ROM), Erasable Programmable ROM (EPROM), Electrically Erasable Programmable ROM (EEPROM), Flash Memory, hard disk, removable disk, CD-ROM, or any type of computer-readable recording medium well known in the art to which the present invention pertains.

Components of the present invention may be implemented into a program (or application) so as to be executed by being combined with a computer, which is hardware to be stored in a medium. Components of the present invention may be implemented as software programming or software components, and similarly, embodiments include various algorithms implemented with a combination of data structures, processes, routines or other programming components to be implemented into a programming or scripting language such as C, C++, Java, and assembler. Functional aspects may be implemented into algorithm running on one or more processors.

Although embodiments of the present invention have been described with reference to the accompanying drawings, those skilled in the art to which the present invention pertains will understand that the present invention can be implemented in other specific forms without changing the technical spirit or essential characteristics. Therefore, it should be understood that the foregoing embodiments are not limited but are illustrative in all respects.

The invention claimed is:

1. A method of matching an artificial intelligent task by a computer, wherein the computer comprises a management server 100, a cloud server 200, and user terminals 300, the method comprising:
obtaining learning data comprising one or more task execution records (S101);
training an artificial intelligence model using the learning data (S102);
collecting one or more applicant information (S103) obtained by the management server from the user terminals;
collecting one or more task information (S104);
matching at least one applicant and at least one task using the artificial intelligence model (S105) performed by the cloud server;
calculating an expanded resource of the applicant based on resource information of the applicant and the multiple of double bidding by multiplying the applicant's resource information by the multiple of double bidding based on the expanded resource; and
providing task information of the number that enables a required resource of the entire task information to be equal to or less than the extension resource of the applicant,
wherein the matching of at least one applicant (S105) comprises:
clustering the one or more applicant information (S115);
clustering the one or more task information (S116);
calculating (S117) a distance between clusters generated as a result of clustering in the clustering of the one or more applicant information (S115) and the clustering of the one or more task information (S116);
determining a degree of association between the clusters based on the calculated distance (S118);
determining a first applicant cluster and a first task cluster in which the determined association degree exceeds a preset reference value (S119); and
matching at least one applicant included in the determined first applicant cluster and at least one task included in the determined first task cluster (S120),
wherein the collecting of one or more task information (S104) comprises obtaining MICE task information comprising a plurality of tasks (S121),
wherein the clustering of the one or more task information (S116) comprises:
determining a plurality of second task clusters comprising each of the plurality of tasks included in the MICE task information (S122), and
determining a middle point of the plurality of second task clusters (S123),
wherein the determining of a first applicant cluster (S119) comprises:
determining a plurality of second applicant clusters in a degree of association with each of the plurality of second task clusters exceeds the reference value (S124), and
determining a third applicant cluster in which a degree of association from the middle point exceeds reference value (S125), and
wherein the matching of at least one applicant (S120) comprises matching a plurality of applicants included in the plurality of second applicant clusters and the third applicant cluster, and the plurality of tasks, respectively (S126).

2. The method of claim 1, wherein the obtaining of learning data (S101) comprises:
collecting data comprising at least one of contents of the task, information on a task registration subject, information on a task execution subject, and a task execution result (S106);
extracting one or more parameters from the collected data (S107); and
generating learning data comprising the extracted one or more parameters (S108).

3. The method of claim 2, wherein the matching of at least one applicant (S105) comprises:
extracting one or more parameters from applicant information of a first applicant (S109);
extracting one or more parameters from task information of a first task (S110);
inputting parameters extracted in the extracting of one or more parameters from applicant information (S109) and the extracting of one or more parameters from task information (S110) to the artificial intelligence model (S111); and
obtaining a suitability degree of the first applicant for the first task from an output of the artificial intelligence model (S112).

4. The method of claim 1, wherein the matching of a plurality of applicants (S126) comprises:
requesting a registration subject of the MICE task information to select a task matching criterion, wherein the task matching criterion comprises a best type and a harmony type (S127);
receiving a selection input from the registration subject of the MICE task information (S128);
matching, when the registration subject of the MICE task information selects a best type, a plurality of applicants included in the plurality of second applicant clusters and the plurality of tasks with each other (S129); and
matching, when the registration subject of the MICE task information selects a harmony type, a plurality of applicants included in the third applicant cluster and the plurality of tasks with each other (S130).

5. The method of claim 1, wherein the matching of at least one applicant (S105) comprises:
obtaining information on the matched task (S131);
obtaining an execution result of the matched task (S132); and
training the artificial intelligence model based on the obtained execution result (S133).

6. A device comprising a computer, comprising:
wherein the computer comprises a management server 100,
a cloud server 200, and user terminals 300,
a memory for storing one or more instructions; and
a processor for executing the one or more instructions stored in the memory, wherein the processor, by executing the one or more instructions, is configured to:
obtain learning data comprising one or more task execution records;
train an artificial intelligence model using the learning data;
collect one or more applicant information obtained by the management server from the user terminals;
collect one or more task information;
calculate an expanded resource of the applicant based on resource information of the applicant and the multiple of double bidding by multiplying the applicant's resource information by the multiple of double bidding based on the expanded resource:
provide task information of the number that enables a required resource of the entire task information to be equal to or less than the extension resource of the applicant; and
match at least one applicant and at least one task using the artificial intelligence model performed by the cloud server;
wherein the perform the match of at least one applicant (S105) comprises:
clustering the one or more applicant information (S115);
clustering the one or more task information (S116);
calculating (S117) a distance between clusters generated as a result of clustering in the clustering of more applicant information (S115) and the clustering of the one or more ta information (S110);
determining a degree of association between the clusters based on the calculated distance (S118);
determining a first applicant cluster and a first ask cluster in which the determined association degree exceeds a preset reference value (S119); and
matching at least one applicant included in the determined first applicant cluster and at least one task included in the determined first task cluster (S120),
wherein the collecting of one or more task information (S104) comprises obtaining MICE task information comprising a plurality of tasks (S121),
wherein the clustering of the one or more task information (S116) comprises:
determining a plurality of second task clusters comprising each of the plurality of tasks included in the MICE task information (S122); and
determining a middle point of the plurality of second task clusters (S123),
wherein the determining of a first applicant cluster (S119) comprises:
determining a plurality of second applicant clusters in which a degree of association with each of the plurality of second task clusters exceeds the reference value (S124); and
determining a third applicant cluster in which a degree of association from the middle point exceeds the reference value (S125), and
wherein the matching of at least one applicant (S120) comprises matching a plurality of applicants included in the plurality of second applicant clusters and the third applicant cluster and the plurality of tasks, respectively (S126).

7. A computer program stored in a recording medium combined with a computer as hardware and readable by a computer so as to perform the method of claim 1.

* * * * *